United States Patent [19]
Goloff

[11] 4,067,670
[45] Jan. 10, 1978

[54] INTERNAL COMBUSTION ENGINE WITH INSULATED PISTON

[75] Inventor: Alexander Goloff, East Peoria, Ill.

[73] Assignee: Caterpillar Tractor Co., Peoria, Ill.

[21] Appl. No.: 749,531

[22] Filed: Dec. 10, 1976

Related U.S. Application Data

[63] Continuation of Ser. No. 574,822, May 5, 1975, abandoned.

[51] Int. Cl.² .................. F01B 31/08; F01C 21/06; F02B 23/00; F02F 3/14
[52] U.S. Cl. .................. 418/61 A; 418/83; 418/178; 123/191 A; 123/193 P; 92/176; 123/8.45
[58] Field of Search .............. 418/61 A, 83, 178; 123/8.01, 8.11, 8.45, 41.16, 191 A, 193 P; 92/176

[56] References Cited

U.S. PATENT DOCUMENTS

| | | | |
|---|---|---|---|
| 1,471,743 | 10/1923 | Legate | 123/191 A |
| 1,500,853 | 7/1924 | Short | 123/191 A |
| 1,605,838 | 11/1926 | Hawley | 123/191 A |
| 1,711,906 | 5/1929 | Sands | 123/191 A |
| 1,814,781 | 7/1931 | Bailey | 123/191 A |
| 2,058,741 | 10/1936 | Taylor | 92/176 |
| 2,104,347 | 1/1938 | Larkin | 92/176 |
| 2,219,989 | 10/1940 | Gimm | 92/176 |

FOREIGN PATENT DOCUMENTS

| | | | |
|---|---|---|---|
| 522,113 | 6/1940 | United Kingdom | 123/193 P |
| 964,131 | 7/1964 | United Kingdom | 123/8.11 |

*Primary Examiner*—John J. Vrablik
*Attorney, Agent, or Firm*—Wegner, Stellman, McCord, Wiles & Wood

[57] ABSTRACT

An improved internal combustion engine of the type having a relatively high surface to volume ratio. An exemplary embodiment depicts the invention in a rotary engine having a rotor within a combustion chamber. The surfaces of the rotor that are exposed to the gases of combustion are provided with a plurality of pockets. Within each pocket is a heat insulating medium. The pockets are covered by a plurality of individual covers, one for each pocket. Heat flow to the rotor is thereby reduced to increase engine operating efficiency.

6 Claims, 3 Drawing Figures

U.S. Patent  Jan. 10, 1978  4,067,670
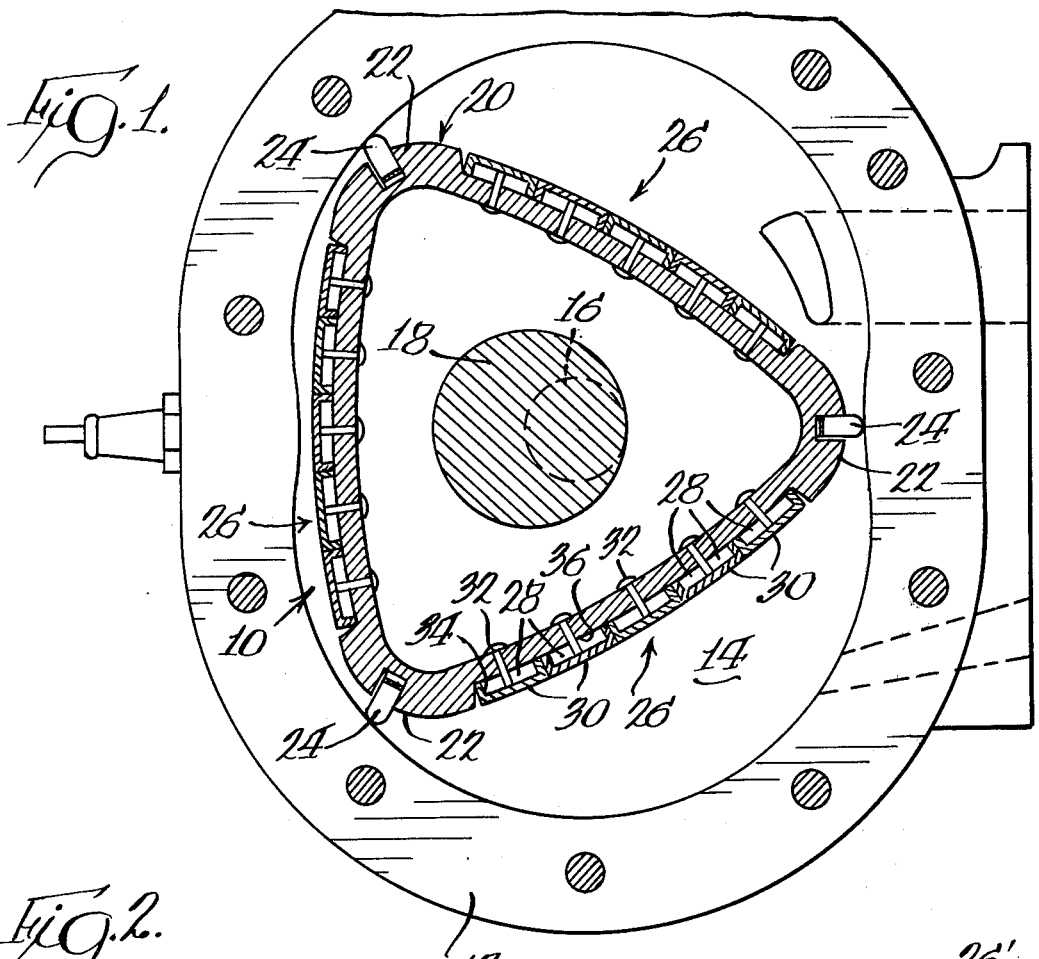
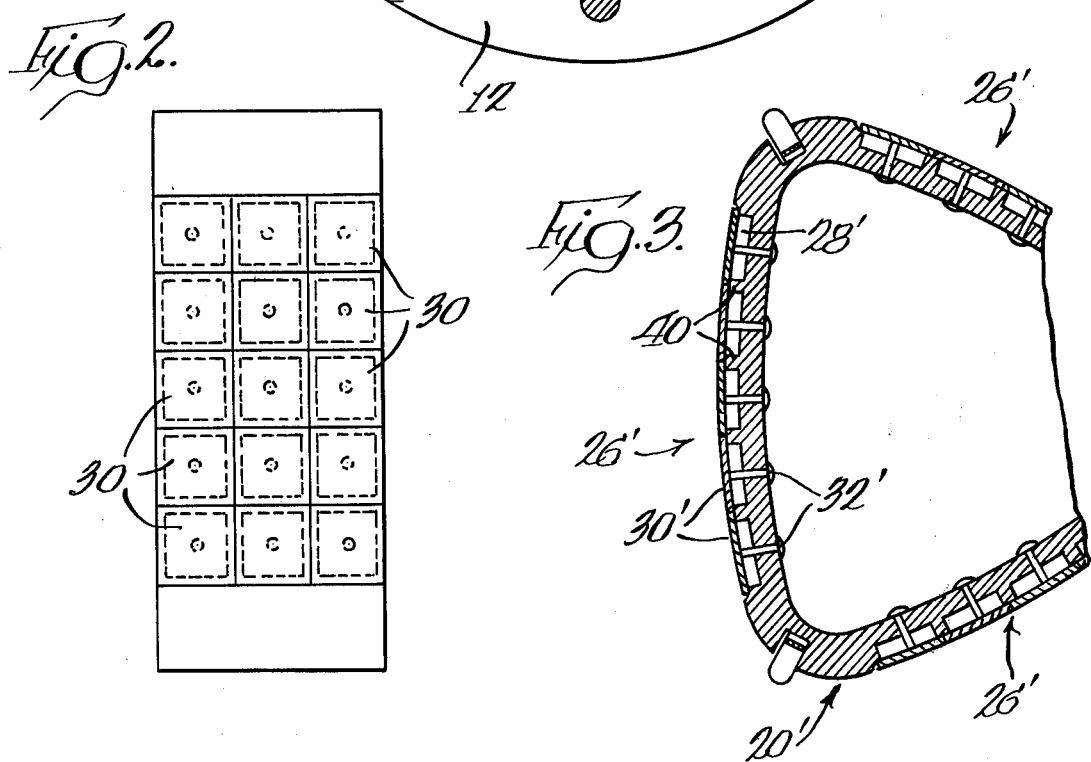

INTERNAL COMBUSTION ENGINE WITH INSULATED PISTON

This is a continuation of application Ser. No. 574,822, filed May 5, 1975, now abandoned.

BACKGROUND OF THE INVENTION

This invention relates to internal combustion engines, and, more particularly, to internal combustion engines having high surface to volume ratios such as rotary engines or short stroke reciprocating engines.

Prior art of possible relevance includes U.S. Pat. No. 3,440,929, issued Apr. 29, 1969 to Weissflog et al.

Present day rotary engines, and, to some extent, short stroke reciprocating engines, characteristically have a high surface to volume ratio in terms of the surfaces exposed to gases of combustion in connection with the working volume of the engine. Such high surface to volume ratios tend to cause poor operating efficiency in contributing to poor combustion and high heat rejection to the coolants employed in cooling the various parts. Hard starting and high hydrocarbon emissions are most undesirable results.

The prior art, to partially overcome the handicaps, has proposed two general solutions. According to one solution, ceramic coatings are applied to rotor surfaces in rotary engines between the rotor apices to retard heat transfer. The principal difficulty with this approach is the fact that typical ceramic coatings cannot be made to adhere to the metal of which the rotors are typically formed for prolonged periods of time in the typical working environment. As a consequence, such engines are relatively short lived and thereby unpractical in a commercial sense.

According to the second approach, the typical cavities provided in the rotors to circulate coolant are employed only for the purpose of circulating coolant in the area of the apex seals. Coolant cavities for cooling the rotor surfaces intermediate the apex seals are plugged to form dead air spaces which provide some insulating value to minimize heat rejection. This approach is not structurally sound in that over a prolonged period, stresses within the rotor caused by large temperature differences from one part to another, ultimately cause structure failure.

SUMMARY OF THE INVENTION

It is the principal object of the invention to provide a new and improved internal combustion engine of the type having a high surface to volume ratio.

The exemplary embodiment of the invention achieves the foregoing in a high surface to volume internal combustion engine having a combustion chamber and an element movable within the chamber having at least one surface disposed to be subjected to gases of combustion. Suitable means are operatively associated with the movable element for converting its movement within the chamber to a desired form of motion. The surface of the movable element is provided with a plurality of pockets and heat insulating means are disposed within each of the pockets. The pockets are then provided with covers which define a continuation of the surface and which are exposed to the gases of combustion.

As a consequence, heat rejection is minimized, resulting in improved operational efficiency.

According to one embodiment of the invention, the pockets are defined by upstanding walls in the movable element adjacent the surface exposed to gases of combustion. According to another embodiment of the invention, the pockets are defined by inturned edges on the covers which embrace a boundary of a recess formed in the surface of the movable element exposed to hot gases of combustion.

Preferably, the covers are formed of a resilient material and are stressed when assembled to the movable element to minimize the entry of gases of combustion into the pockets.

In a highly preferred embodiment of the invention, the engine is a rotary engine and the movable element is a rotor having plural surfaces exposed to gases of combustion. The pockets, insulating means and covers are provided in each of the surfaces.

Other objects and advantages will become apparent from the following specification taken in conjunction with the accompanying drawings.

DESCRIPTION OF THE DRAWINGS

FIG. 1 is a view of an internal combustion engine embodying the invention with parts shown in section for clarity;

FIG. 2 is a side view of a rotor employed in connection with the invention; and

FIG. 3 is a sectional view of a rotor showing a modified embodiment of the invention.

DESCRIPTION OF THE PREFERRED EMBODIMENTS

Exemplary embodiments of an internal combustion engine embodying the invention are illustrated in the drawings in the form of a so-called "Wankel" rotary engine. However, it is to be expressly understood that the invention is not limited to any particular type of engine, it being applicable to all internal combustion engines having relatively high surface to volume ratios. For example, the invention may be employed advantageously in slant axis rotary engines as well as short stroke reciprocating engines.

Referring specifically to FIG. 1, a combustion chamber, generally designated 10, is defined by a center housing 12 and a pair of end housings 14 (only one of which is shown) in a conventional fashion. A shaft 16 is suitably journalled in bearings (not shown) and extends through the chamber 10. Within the chamber 10, the shaft 16 includes an eccentric 18 journalling a rotor, generally designated 20. The eccentric 18, in connection with gearing on the rotor and on one of the end plates 14, not shown, converts the well-known movement of the rotor 20 during operation of the engine into rotary motion.

The rotor 20 is provided with three apices 22, each of which is provided with an apex seal 24 in a conventional fashion. Intermediate the apices 22, the rotor 20 has three surfaces, generally designated 26, which are subjected to the hot gases of combustion generated by the engine during operation. Each of the surfaces 26 is provided with a plurality of pockets 28 which are filled with an insulating material. For purposes of the invention the insulating material may simply be a vacuum or a gas, such as air, or, any other known insulating material, which can be in solid form, that will impede the transfer of heat from the surfaces 26 to the conventional interior coolant passages (not shown) of the rotor.

Each of the pockets 28 is provided with a cover 30 to maintain the insulating material within the pocket. The covers 30 are secured to the rotor 20 by any suitable means such as bolts or rivets 32.

In the embodiment illustrated in FIGS. 1 and 2, the pockets 28 are further defined by inturned edges or walls 34 integral with the cover which abut the bottom surface of a recess 36 formed in each of the surfaces 26 of the rotor 20. In this connection, it is highly desirable that the covers 30 be formed of a heat resistant alloy having some resilience. As a consequence of this characteristic, when assembled to the rotor, the covers 30 may be somewhat stressed so that the edges of the walls 34 tightly embrace the recess 36 to minimize the possibility of the entry of hot gases of combustion into the pockets 28.

It will be appreciated that the desired operating temperature of the rotor can be controlled by regulating the width of the walls 34 and the diameter of the rivets 32.

Once the covers 30 have been installed, the rotor 20 may be finish machined to the final desired shape.

A modified embodiment is illustrated in FIG. 3. In this case, each of the surfaces 26' of the rotor 20' is provided with pockets 28' integrally cast in the surfaces 26'. The cavities 28' are defined by upstanding walls 40 separating the same. In the case of the embodiment illustrated in FIG. 3, the covers 30' are virtually planar. The material of which the covers 30' are formed should have the same characteristics mentioned above in connection with the embodiment of FIGS. 1 and 2 and should be slightly stressed when secured in place. Again, after the covers 30' have been installed, the rotor may be finish machined.

In either embodiment, a small gap between adjacent ones of the covers 20 or 20' on the order of a few thousandths of an inch should be provided when the rotor is cold. As the engine reaches normal operating temperature, thermal expansion will cause the covers 30' to expand somewhat to close such a minimal gap.

From the foregoing, it will be seen that heat rejection causing poor operating efficiency of high surface to volume internal combustion engines is minimized. It will also be recognized that no special bonding techniques subject to early failure are required. At the same time, it will be appreciated that the rotor may be cooled in a conventional fashion, avoiding substantial temperature differences from one point thereon to others and the resulting shortening of rotor life.

As mentioned, while the invention has been described in connection with rotary engines, it may be advantageously employed in short stroke reciprocating engines having high surface to volume ratios by providing such pockets, insulating material and covers on piston surfaces exposed to the gases of combustion.

I claim:

1. In an internal combustion engine having a relatively high surface to volume ratio, the combination of: means defining a combustion chamber; means movable within said chamber and having at least one surface disposed to be subject to gases of combustion; means operatively associated with said movable means for converting movement thereof to a desired form of motion; a plurality of pockets in each said surface; heat insulation means within each of said pockets; and a plurality of covers, one for each said pocket, secured to said movable means to tightly embrace the movable means and close the corresponding one of said pockets to minimize the entry of hot gases of combustion into said pockets, said covers defining a continuation of said surface and being exposed to said gases of combustion, whereby heat loss to said movable means is retarded to increase engine efficiency.

2. An internal combustion engine according to claim 1 wherein said pockets are defined by upstanding walls on said movable means in close proximity to said surface.

3. An internal combustion engine according to claim 1 wherein said pockets are defined by inturned walls integral with said covers and tightly embracing a recess within said movable means surface.

4. An internal combustion engine according to claim 1 wherein said covers are formed of a resilient material and wherein said covers are secured to said movable means in a stressed condition to tightly embrace said movable means to minimize said entry of combustion gases into said pockets.

5. An internal combustion engine according to claim 1 wherein said engine is a rotary engine and said movable means is a rotor having plural ones of said surfaces disposed to be subjected to gases of combustion, each of said surfaces being provided with said plurality of pockets, said heat insulation means and said covers.

6. In an internal combustion engine having a relatively high surface to volume ratio, the combination of: a housing defining an operating chamber; a piston movable within said chamber and having at least one surface disposed to be subject to gases of combustion; means, including a shaft, operatively associated with said piston for converting movement thereof to a desired form of motion; a plurality of pockets in each said surface(s); heat insulation means within each of said pockets; and a plurality of generally flat covers, one for each said pocket, secured to said movable means to tightly embrace the movable means and close the corresponding one of said pockets to minimize the entry of hot gases of combustion into said pockets, said covers defining a continuation of said surface and being exposed to said gases of combustion, said covers being slightly spaced from each other by a small gap when said piston is cold so that when said engine reaches normal operating temperature, thermal expansion of said covers will cause said gaps to close.

* * * * *